(12) United States Patent
Greenaway et al.

(10) Patent No.: US 6,301,420 B1
(45) Date of Patent: Oct. 9, 2001

(54) MULTICORE OPTICAL FIBRE

(75) Inventors: Alan H. Greenaway, Malvern; Peter A. Lloyd, Farnborough; Timothy A. Birks, Claverton Down; Philip S. Russell, Claverton Down; Jonathan C. Knight, Claverton Down, all of (GB)

(73) Assignee: The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/070,747

(22) Filed: May 1, 1998

(51) Int. Cl.⁷ .............................. G02B 6/02; C03B 37/15
(52) U.S. Cl. .................... 385/126; 385/123; 385/126; 385/115; 65/409; 65/411
(58) Field of Search ........................... 385/123, 124, 385/125, 126, 121, 115, 116; 359/332; 65/385, 409, 410, 411, 412

(56) References Cited

U.S. PATENT DOCUMENTS

| | | | |
|---|---|---|---|
| 4,300,816 | * 11/1981 | Snitzer et al. | 384/126 |
| 5,155,792 | * 10/1992 | Vali et al. | 385/125 |
| 5,321,257 | * 6/1994 | Danisch | 250/227.16 |
| 5,802,236 | * 9/1998 | DiGiovanni et al. | 385/127 |
| 5,805,751 | * 9/1998 | Kewitsch et al. | 385/43 |

OTHER PUBLICATIONS

Birks et al., "Full 2–D Photonic Bandgaps in Silica/Air Structures", Electronic Letters, vol. 31 (22), p. 1942 (Oct. 1995).*

* cited by examiner

Primary Examiner—Hemang Sanghavi
(74) Attorney, Agent, or Firm—Nixon & Vanderhye P.C.

(57) ABSTRACT

An optical fiber for transmitting radiation comprising two or more core regions, two or more core regions, each core region comprising a substantially transparent core material and having a core refractive index, a core length, and a core diameter, wherein said core regions are arranged within a cladding region, said cladding region comprising a length of first substantially transparent cladding material, having a first refractive index, wherein said first substantially transparent cladding material has an array of lengths of a second cladding material embedded along its length, wherein the second cladding material has a second refractive index which is less than said first refractive index, such that radiation input to said fiber propagates along at least one of said core regions. The cladding region and the core regions may be arranged such that radiation input to said optical fiber propagates along one or more said lengths of said core regions in a single mode of propagation. The optical fiber may be used as a bend sensor, a spectral filter or a directional coupler. The invention also relates to a method of manufacturing a multicore optical fiber.

19 Claims, 5 Drawing Sheets

MULTICORE OPTICAL FIBRE

BACKGROUND OF THE INVENTION

1. Field of the Invention

The invention relates to an optical fibre having at least two cores for propagating radiation. The invention also relates to a method of making such a fibre.

2. Discussion of Prior Art

Optical fibres with two cores have been reported and applied to various problems in optical sensing and telecommunications. The potential of multicore fibres with more than two single-mode cores has also been recognized [S. Prasad: "Focusing light into a multiple-core fiber II application to ground-based interferometry", Optics Communications 115 (1995) 368–378]. For example, bend sensing in the plane has been demonstrated using a four-core fibre, using a technique that can readily be extended to the monitoring of bending in three dimensions [M. J. Gander et al., "Bend measurements using multicore optical fiber", presented at OFS 12 1997 ].

However, at present there are relatively few applications for multicore optical fibres. This is because it is very difficult to make multicore fibres with the required uniformity and geometrical accuracy. One way which has been reported is to use an extension of the process previously used to make two-core fibres. In this method, single-core preforms made by standard vapour-phase techniques are precisely machined and are then assembled to form a multicore preform. The multicore preform is then drawn into fibre [G. Le Noane et al., "Ultra high density cables using a new concept of bunched multicore monomode fibers: A key for future FTTH networks", Proceedings of the International Wire & Cable Symposium (1994) 203–210]. This process, starting from a number of single core preforms, is a time-consuming and costly process. Furthermore, the addition of each extra core adds further complexity to the multicore preform. Higher multiplicity core fibres are therefore increasingly difficult to fabricate.

A single-mode photonic crystal fibre (PCF) is described by J. C. Knight et al., "All silica single-mode optical fiber with photonic crystal cladding", Optics Letters 21 (1996) 1547–1549 and is of relevance to the present invention.

SUMMARY OF THE INVENTION

The present invention relates to a multicore optical fibre which can be made more easily than known multicore fibre and each core of which is capable of transmitting radiation in a single mode of propagation.

According to the present invention, a multicore optical fibre for transmitting radiation comprises;

two or more core regions, each core region comprising a substantially transparent core material and having a core refractive index, a core length, and a core diameter, wherein said core regions are arranged within a cladding region, said cladding region comprising a length of first substantially transparent cladding material, having a first refractive index, and wherein said first substantially transparent cladding material has an array of lengths of a second cladding material embedded along its length, wherein said second cladding material has a second refractive index which is less than said first refractive index, such that radiation input to said fibre propagates along at least one of said core regions.

This provides an advantage over known multicore fibre in that, in the preform, the core regions may be automatically positioned in the precise geometry required without the need for accurate machining and assembly of single-core preforms. In addition, each core region may be single mode over a wide wavelength range.

The cladding region and the core regions may be arranged such that radiation input to the fibre propagates along at least one of the core regions in a single mode of propagation.

The first substantially transparent cladding material may have a substantially uniform first refractive index. One or more of the core materials may have a substantially uniform core refractive index. Each of the core regions may comprise the same core material. The first substantially transparent cladding material and the core materials may be substantially the same. In a preferred embodiment, at least one of the first substantially transparent cladding material and one of the core materials may be silica.

The array of lengths of the second cladding material may be an array of holes embedded along the length of the first substantially transparent cladding material. The holes may be a vacuum. Alternatively, the second cladding material may be air, liquid or a substantially transparent material. The substantially transparent core material of at least one of the core regions may comprise a dopant. At least one of the first or second cladding material may comprise a dopant. The second cladding material may comprise an amount of the first cladding material.

According to another aspect of the invention, a bend sensor comprises the multicore photonic crystal fibre of the present invention.

According to another aspect of the invention, a directional coupler comprises the multicore photonic crystal fibre of the present invention.

According to another aspect of the invention, a spectral filter comprises the multicore photonic crystal fibre of the present invention.

According to another aspect of the invention, a method of manufacturing a multicore optical fibre comprises the steps of;

(i) forming the fibre preform by arranging a plurality of composite rods in an array, each of said rods comprising a first substantially transparent cladding material, having a first refractive index, and each of said rods having a length, wherein said rods have an array of lengths of a second cladding material embedded along said rod lengths, wherein said second cladding material has a second refractive index which is less than said first refractive index, (ii) arranging at least two rods comprising a substantially transparent core material within said fibre preform, and (ii) drawing said fibre preform in fibre drawing apparatus to form said multicore optical fibre.

BRIEF DESCRIPTION OF THE DRAWINGS

The invention will now be described, by example only, with reference to the following figures in which.

DETAILED DISCUSSION OF PREFERRED EMBODIMENTS

Single-core photonic crystal fibre is made by a stack and draw process as described by J. C. Knight et al., "All silica single-mode optical fiber with photonic crystal cladding", Optics Letters 21 (1996) 1547–1549. The fibre comprises a cladding of an array of air holes that run along the length of the fibre. The holes are arranged in a hexagonal honeycomb pattern across the cross-section, with a spacing of the order of microns. Such a repeating structure with a period of the order of an optical wavelength is called a photonic crystal. However, the central hole is absent, leaving a solid silica "defect" in the crystal structure that acts as the core of the fibre. Light is guided in this core by total internal reflection from the cladding, which effectively has a lower refractive index. The effective index of the photonic crystal cladding has unusual properties that can enable the fibre to be single-mode under all circumstances, unlike conventional step-index fibres. This property is governed by the size of the air holes.

The present invention relates to a multicore photonic crystal fibre. The fibre has a photonic crystal structure but instead of having a single central defect it has two or more defects introduced throughout the structure. Despite the complex structure, the multicore fibre is relatively simple to construct, and higher multiplicity core structures are as easy to fabricate as less complex two or three core structures.

Figure 1:
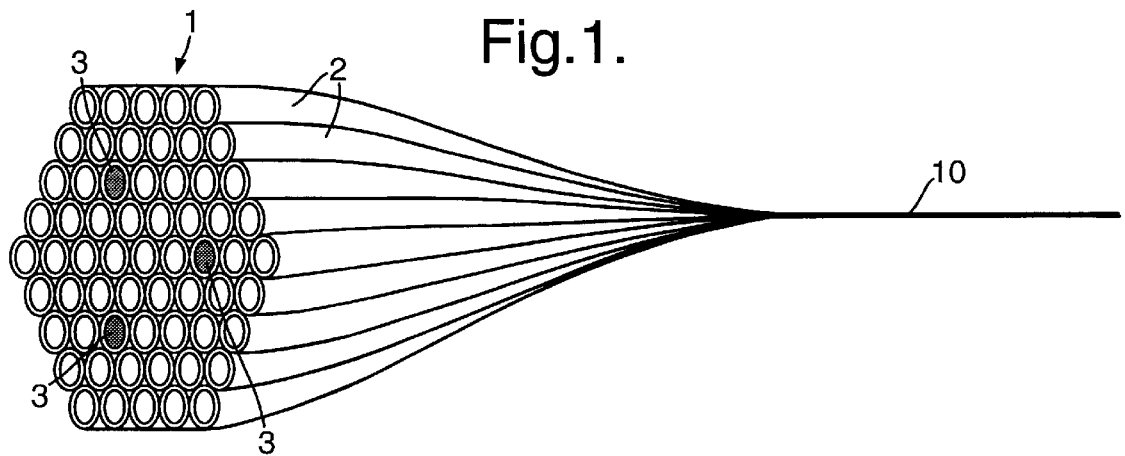
FIG. 1 shows the construction of a three-core photonic crystal fibre.

FIG. 1 shows a multicore photonic crystal fibre preform 1. This illustrates the structure of a multicore photonic crystal when drawn into a fibre, referred to generally as 10. The preform 1 may be made by stacking substantially identical capillary rods 2 in an array. A number of the rods 2 in the array are replaced, at appropriate sites, with substantially solid or substantially filled rods 3 of the same diameter as the rods 2. The substantially solid or substantially filled rods 3 shall be referred to as "cores" or "core regions". In the example shown in FIG. 1, the preform used to make the fibre has three cores 3 arranged at the corners of the equilateral triangle. The fibre 10 can then be drawn from this preform 1 in conventional fibre drawing apparatus, such as a fibre drawing tower. The resultant fibre remains stable, despite undergoing extreme deformation and high temperatures during the drawing process.

The rods 2 comprise a first cladding material, having a first refractive index, which is substantially transparent and is capable of being drawn into a fibre. The rods 2 form a cladding region around the cores 3. Typically, this first cladding material may be silica. Embedded along their length the rods 2 have a second cladding material of a second refractive index, the second refractive index being less than the first refractive index. The cores 3 comprise a substantially transparent core material and are arranged within the cladding region.

Typically, the rods 2 may be rods of silica. The rods may be hollow (i.e. the second cladding material is air or a vacuum) or may be substantially solid. By way of example, in preform state hollow rods 2 may have an external diameter of between 0.5 mm and 2 mm and an internal diameter between 0.5 mm and 1.8 mm. The length of the rods can be chosen to suit the particular application for which the fibre is required. The stack typically has ten or so rods 2 along each hexagonal edge and the stack will still sit comfortably inside the furnace on a fibre drawing tower. Preferably, the array of rods may be a hexagonal arrangement. In the final state, the drawn fibre 10 may typically have a hole spacing of between 1 μm to 10 μm and a hole diameter of 0.1 μm to 0.3 μm.

The second cladding material within the rods 2 may be air-filled holes. Alternatively, the second cladding material within the rods 2 may be vacuum region (a vacuum having a refractive index less than that of the first cladding material). Alternatively, the rods may be filled with any material which has a lower refractive index than that of the first cladding material (i.e. the material from which the rods are formed) and is also capable of being drawn into a fibre, or the rods may be filled with any such material which may be inserted into the rods after they have been drawn to their small size. For example, the rods may be filled with air or another gas (e.g. hydrogen or hydrocarbon), a solid material (e.g. a different glass material having a different refractive index from that of the first cladding material) or a liquid (e.g. water, aqueous solutions or solutions of dyes). The rods may also be partially filled with an amount of the first cladding material. The second cladding material within the holes need not necessarily be transparent.

The core material may be any substantially transparent material but need not necessarily be the same material as the first cladding material. In one embodiment, the multicore PCF may be made entirely from undoped fused silica so that the rods 2 are hollow silica rods and the cores 3 are formed by solid rods of silica. The complete structure may therefore be made entirely from fused silica.

Each of the cores may be formed from a different material and have different propagation properties. Any one of the cores may be doped with a dopant material, for example erbium or other rare earth elements. Alternatively, or in addition, any one of the cores may be doped with a material which will change the refractive index or make the glass photosensitive, for example Boron or Germanium. It is also possible to dope the cladding region (i.e. the first or second cladding material) with any of the above mentioned materials.

Figure 2:
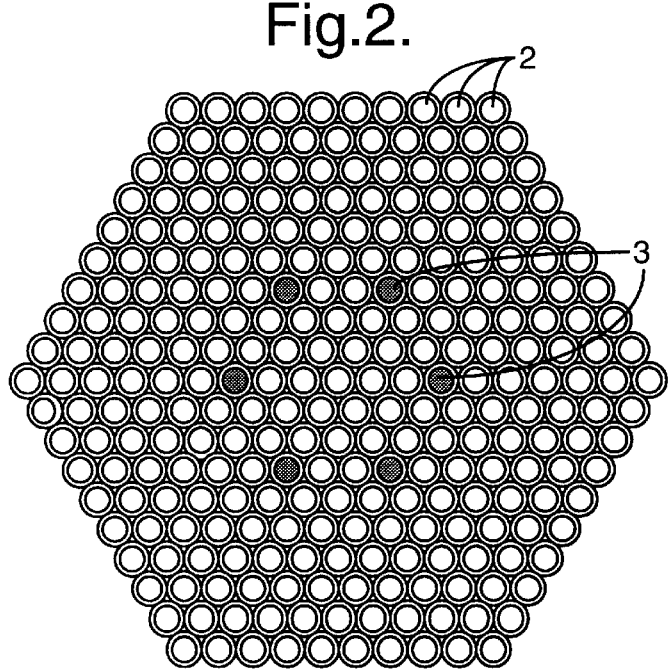
FIG. 2 shows a schematic end-view diagram illustrating the arrangement used to make a six-core fibre.

FIG. 2 shows a schematic diagram of the end view of an arrangement of tubes and rods used to make a six-core multicore PCF. The preform had six cores 3 arranged at the corners of a hexagon. The preforms can then be drawn down into low-loss six-core fibre, as described above.

By varying the extent to which the rods collapse during fibre drawing process, the cores may be made single-mode if required. The cores may also be close enough together for directional coupling to take place between them. A good approximation to the coupling beat length $L_B$ between two PCF cores is given by the expression:

$$L_B = (2\pi WD)^{1/2} n_0 \frac{2\pi \Lambda^2}{\lambda} \frac{V^2}{U^2} K_1^2(W) e^{WD} \qquad (1)$$

which is based on the effective V-value discussed by T. A. Birks et al., "Endlessly single mode photonic crystal fiber", Optics Letters 22 91997) 961–963 and adapted from a well-known expression for two coupled step-index cores [A. W. Snyder and J. D. love, "Optical waveguide Theory", Chapman and Hall, London (1983)]. W and U are the familiar normalized parameters of a step-index fibre with the same V, $n_0$ is the index of silica $K_1$ is the modified Bessel function, and D is the separation of the cores in multiples of Λ (Λ is the hole spacing).

For the six-core fibre shown in FIG. 2, having a hole spacing in the drawn fibre of 2.5 μm and a hole diameter of 0.3 µm, the equation predicts a two-core beat length of about 6 mm. This order of magnitude has been confirmed by spectral coupling measurements.

Figure 3:
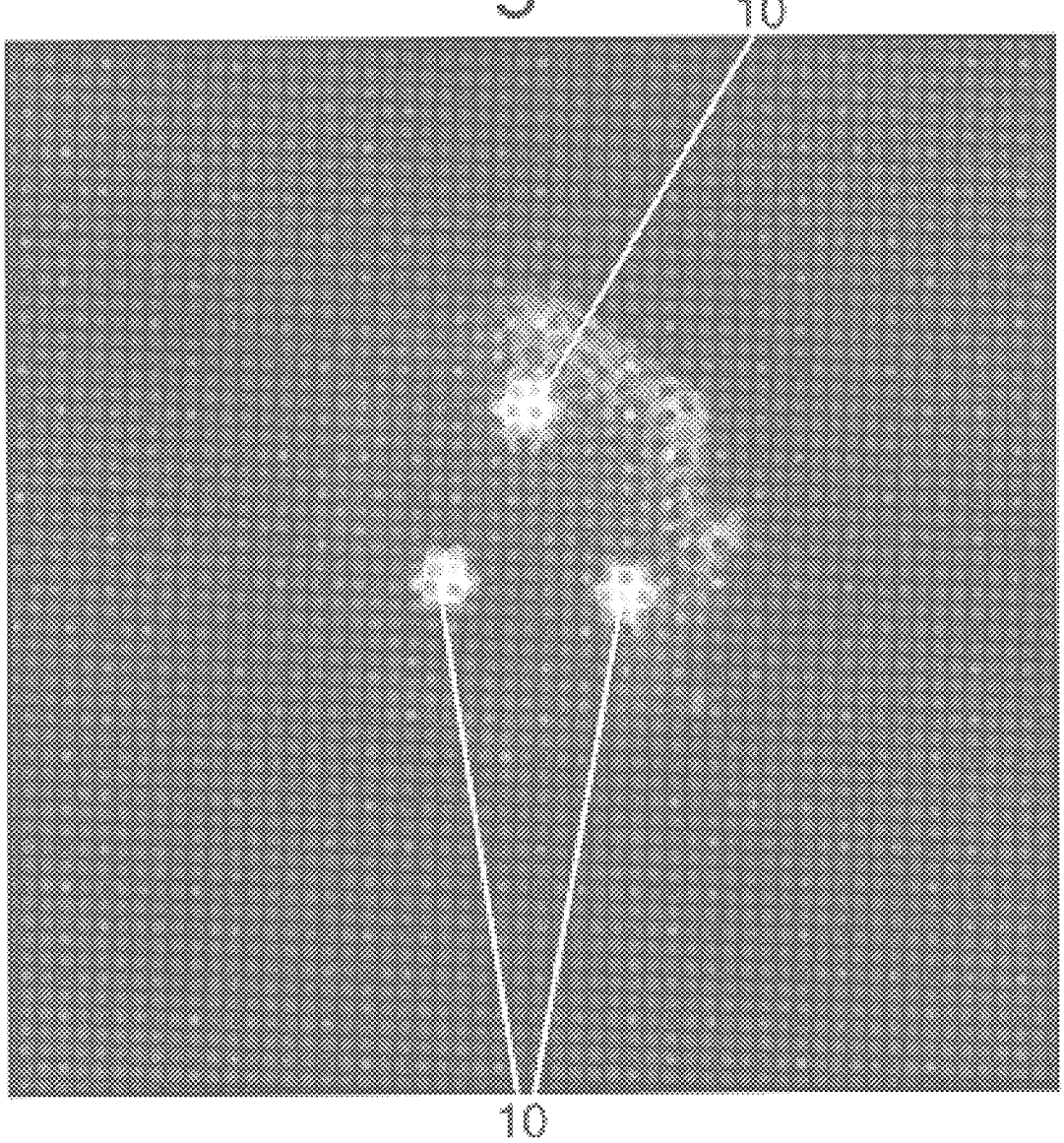
FIG. 3 shows an optical micrograph of a three-core fibre.

FIG. 3 shows an optical micrograph of a three-core fibre (as shown in FIG. 1). The hole spacing is approximately 2.5 µm after the fibre has been drawn. Here, the cores are spaced far enough apart for Equation (1) to predict that there is no directional coupling between them. Measurements show this was the case. Hexagonally symmetric single mode patterns 10 can be seen at each core. Light could be independently launched in any or all of the cores.

Figure 4:
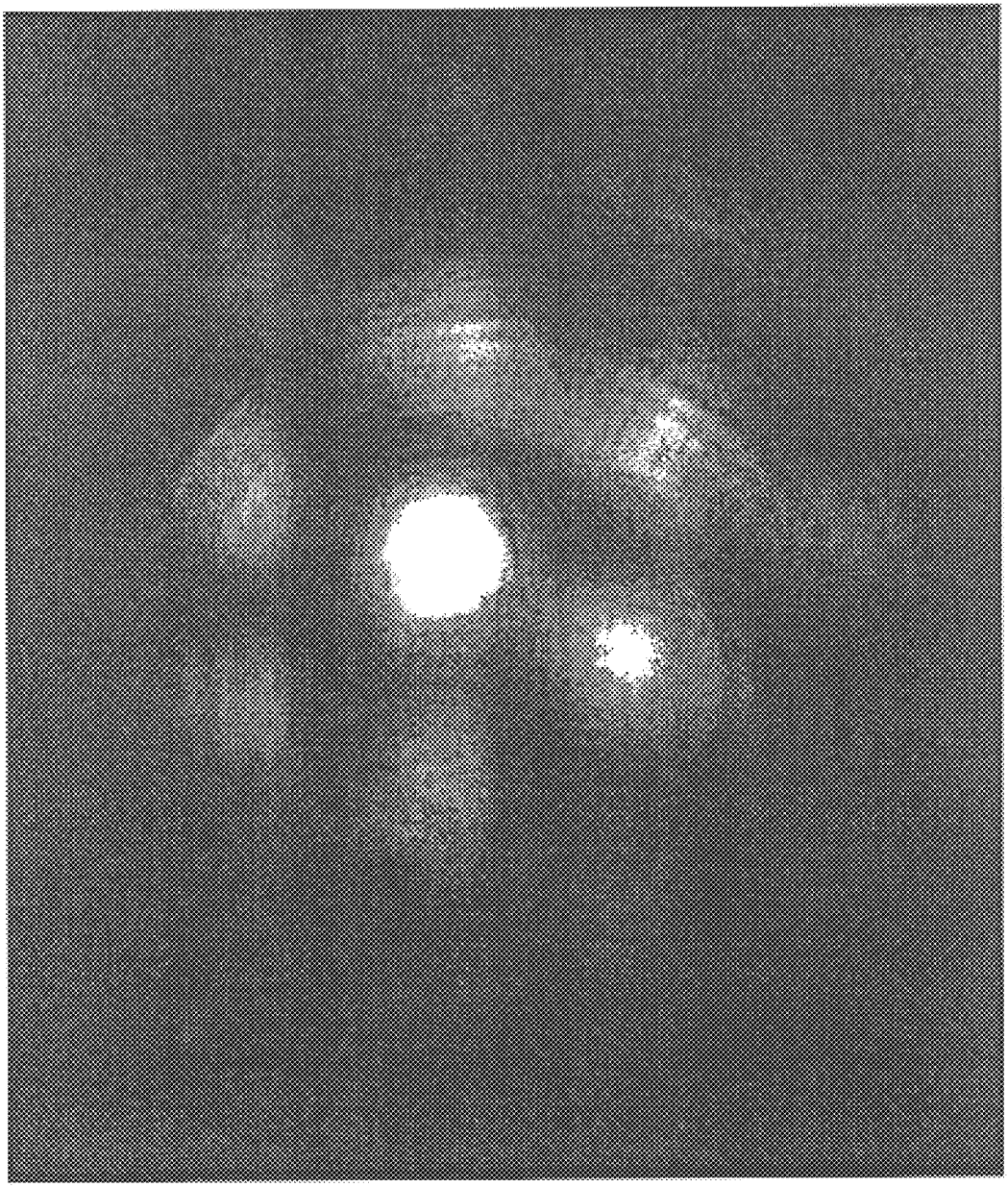
FIG. 4 shows the far field pattern emerging from the end of a three-core fibre when all three cores are illuminated.

The far field pattern emerging from the fibre shown in FIG. 3 with all three cores illuminated is shown in FIG. 4. A three-wave interference fringe pattern modulating a single-core PCF far field pattern is evident. The fringe pattern moves when the fibre is bent in different ways part-way along its length. The multicore fibre therefore has an application as a bend sensor, whereby measurement of the relative shift in the fringe pattern provides an indication of the extent by which the fibre is bent. If the fibre is embedded in a structure, this therefore provides an indication of the extent to which the structure is bent.

Compared to known multicore fibres, the multicore PCF provides the advantage that, during fabrication, the core regions may be automatically positioned in the precise geometry required, without the need for accurate machining and assembly of single-core preforms. During the fabrication process, the multicore photonic crystal preform (as shown in FIG. 1) is drawn on a fibre drawing tower inside a furnace. Despite the high fabrication temperatures required to draw the fibre, and the drawing down of the preform to such small scales, the resultant fibre is stable with core regions retaining the precise positions of the single preform. Hence, multicore photonic crystal fibres can be fabricated more easily than conventional mulitcore fibres. Furthermore, fibres with a high number of cores can be made as easily and as reliably as fibres with just two or three cores. Other stacking geometries may be adopted, for example rectangular, by choosing an appropriate shape for stacking the rods. A further advantage of the invention is that the raw materials from which the preforms are made may be ordinary silica capillary rods or tubes. It is not therefore necessary to make or otherwise procure any single-core preforms as is the case for conventional multicore fibres. In addition, fibres with cores coupled to different (or varying) extents can be drawn from just one preform.

Another significant advantage is that each individual core can be guaranteed to be single-mode at all wavelengths if required. The absence of core dopants removes the problem of colour centre formation and darkening that is a feature of conventional doped fibres, and makes possible the transmission of high blue/green laser powers without degradation.

Figure 5:
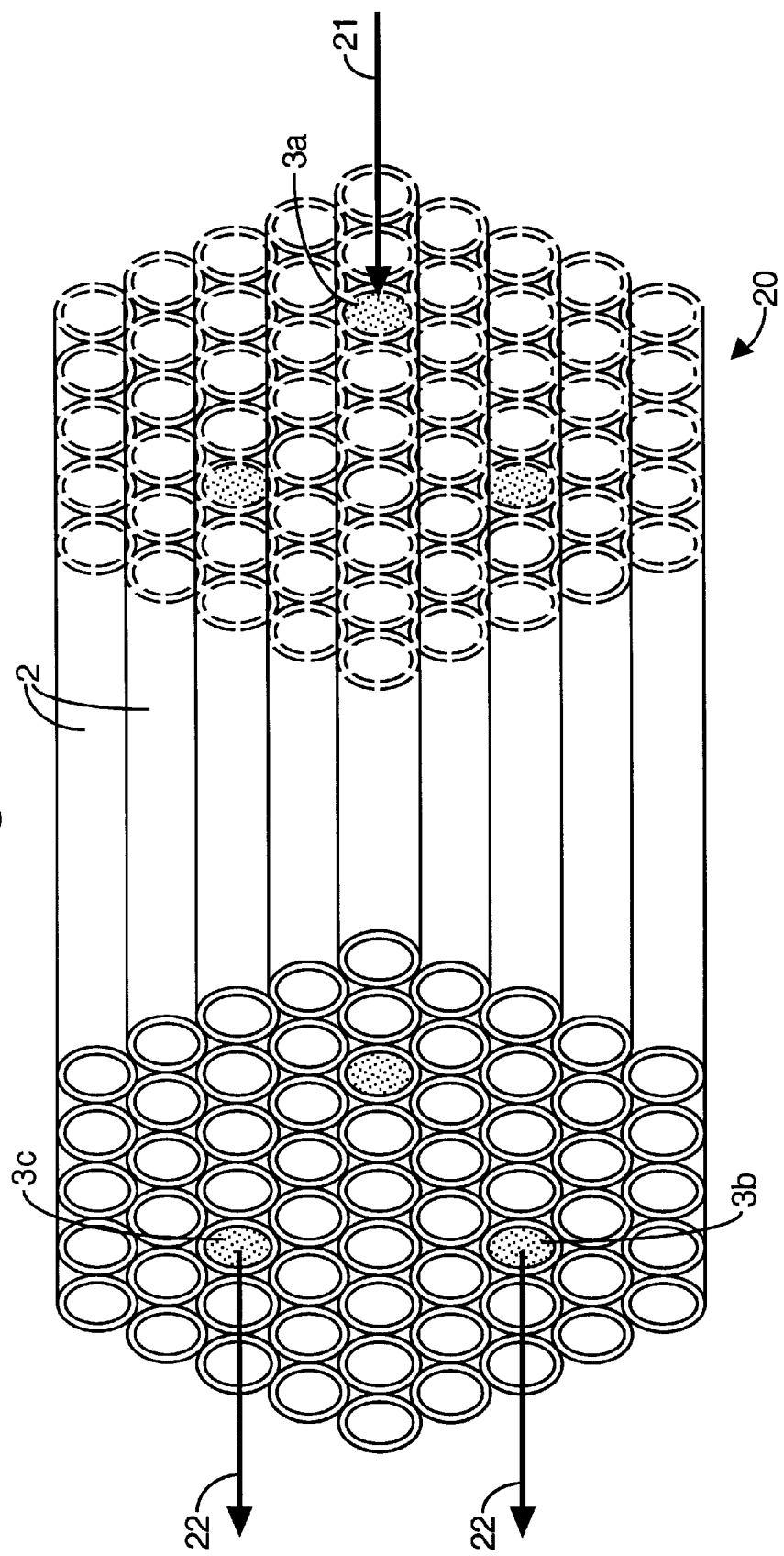
FIG. 5 shows an example of a directional coupler device comprising multicore photonic crystal fibre of the present invention and FIG. 6 shows an example of a spectral filter comprising multicore photonic crystal fibre of the present invention.

The individual cores can be made to support a single mode or several modes by changing the temperature at which the fibre is drawn, which controls the internal diameter of the rods. Likewise, coupling (if any) between the cores is determined by the drawing temperature as well as by the locations of the cores. This structure offers the opportunity to study the coupling between a possibly large number of cores under a variety of conditions. For example, the fibre may also be used as a directional coupler device. By way of example, FIG. 5 illustrates an example of part of a directional coupler device 20 comprising multicore photonic crystal fibre of the present invention, whereby input radiation 21 is input to core 3a and is output (22) from both cores 3b and 3c.

Figure 6:
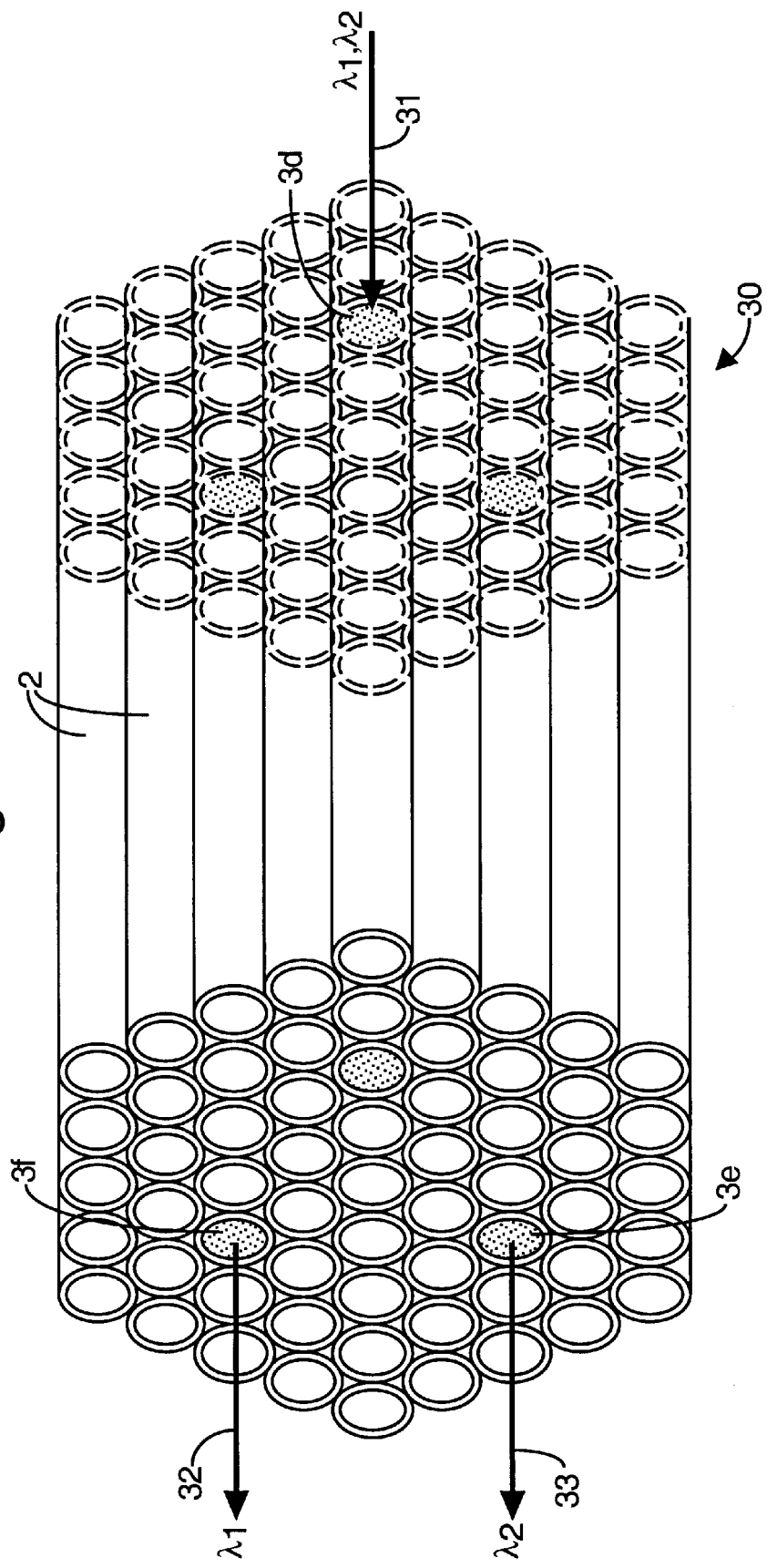

Furthermore, the multicore fibre has applications in optical sensing, for example as a bend sensor. The fibre may also be used to provide several transmission lines within one structure, all of which may be single mode, which may be used to transmit different signals through different lines, for example in communications applications. As the cores within the fibre can also be made to interact, the fibre can be arranged to provide a filter, such that only radiation of certain wavelengths is transmitted to a particular core. By way of example, FIG. 6 shows an illustration of an example spectral filter device 30 comprising multicore photonic crystal fibre of the present invention, whereby radiation 31 comprising wavelength components $\lambda_1$ and $\lambda_2$ is input to core 3d and radiation 32, 33, having wavelengths $\lambda_1$ and $\lambda_2$ respectively, is output from cores 3d and 3e respectively.

Further types of filter devices, for example grating assisted couplers, become possible if at least one of the cores is photosensitive and one or more Bragg gratings are written in the fibre, for example by exposure to ultra violet light.

What is claimed is:

1. A multicore optical fibre for transmitting radiation comprising:

two or more core regions, each core region comprising a substantially transparent core material and having a core refractive index, a core length, and a core diameter, wherein said core regions are arranged within a cladding region, said cladding region having an effective index of refraction and comprising a length of first substantially transparent cladding material, having a first refractive index, wherein said first substantially transparent cladding material has an array of lengths of a second cladding material embedded along its length, wherein said second cladding material has a second refractive index which is less than said first refractive index, said core regions having a refractive index greater than said cladding region and said core regions and said cladding region arranged to propagate radiation input to said fibre along at least one of said core regions by the principle of total internal reflection.

2. The fibre of claim 1, wherein said cladding region and said core regions are arranged such that radiation input to said fibre propagates along at least one of said core regions in a single mode of propagation.

3. The fibre of claim 1, wherein each of said core regions comprise the same core material.

4. The fibre of claim 1 wherein said first substantially transparent cladding material has a substantially uniform first refractive index.

5. The fibre of claim 1 wherein one or more of said core materials has a substantially uniform core refractive index.

6. The fibre of claim 1, wherein said first substantially transparent cladding material and said core materials are substantially the same.

7. The fibre of claim 1, wherein at least one of said first substantially transparent cladding material and one of said core materials are silica.

8. The fibre of claim 1 wherein said array of lengths of said second cladding material are an array of holes embedded along said length of said first substantially transparent cladding material.

9. The fibre of claim 8 wherein said holes are a vacuum.

10. The fibre of claim 1 wherein said second cladding material is air.

11. The fibre of claim 1 wherein said second cladding material is a liquid.

12. The fibre of claim 1 wherein said second cladding material is a substantially transparent material.

13. The fibre of claim 1 wherein said substantially transparent core material of at least one of said core regions comprises a dopant.

14. The fibre of claim 1 wherein at least one of said first or second cladding material comprises a dopant.

15. The fibre of claim 1, wherein said second cladding material comprises an amount of the first cladding material.

16. A bend sensor comprising the multicore photonic crystal fibre of claim 1.

17. A directional coupler comprising the multicore photonic crystal fibre of claim 1.

18. A spectral filter comprising the multicore photonic crystal fibre of claim 1.

19. A method of manufacturing a multicore optical fiber comprising the steps of:
   (i) forming a fibre preform by arranging a plurality of composite rods in an array, each of said rods comprising a first substantially transparent cladding material, having a first refractive index, and each of said rods having a length, wherein said rods have an array of lengths of a second cladding material embedded along said rod lengths, wherein said second cladding material has a second refractive index which is less than said first refractive index,
   (ii) arranging at least two rods comprising a substantially transparent core material within said fibre preform, said core material having a refractive index greater than said fibre preform and
   (ii) drawing said fibre preform in fibre drawing apparatus to form said multicore optical fibre wherein said core material and said first and second cladding materials are arranged to propagate radiation input to said fibre by the principle of total internal reflection.

\* \* \* \* \*